(12) United States Patent
Schmit et al.

(10) Patent No.: US 8,632,264 B2
(45) Date of Patent: Jan. 21, 2014

(54) PRIVACY SHUTTER FOR CAMERAS

(75) Inventors: Thomas Paul Schmit, Huntington, NY (US); John M. Kovach, Shoreham, NY (US); Robert John Probin, East Kilbride (GB)

(73) Assignee: Honeywell International Inc., Morristown, NJ (US)

( * ) Notice: Subject to any disclaimer, the term of this patent is extended or adjusted under 35 U.S.C. 154(b) by 62 days.

(21) Appl. No.: 12/963,299

(22) Filed: Dec. 8, 2010

(65) Prior Publication Data

US 2012/0148227 A1   Jun. 14, 2012

(51) Int. Cl.
*G03B 17/00* (2006.01)
*G03B 29/00* (2006.01)
*G02B 23/16* (2006.01)
*H04N 5/232* (2006.01)
*H01L 27/146* (2006.01)

(52) U.S. Cl.
USPC ............. 396/448; 396/56; 396/427; 396/433; 359/511; 348/211.2; 250/370.08

(58) Field of Classification Search
USPC ........... 396/448, 183, 184, 452, 56, 427, 433; 359/507, 511; 348/211.1, 211.2, 211.4, 348/211.8; 250/370.08
See application file for complete search history.

(56) References Cited

U.S. PATENT DOCUMENTS

| 5,598,237 A * | 1/1997 | McIntyre et al. ............. 396/264 |
| 2004/0184799 A1* | 9/2004 | Sherwin ........................ 396/448 |
| 2009/0080878 A1* | 3/2009 | Cirker ........................... 396/433 |

* cited by examiner

*Primary Examiner* — Rochelle-Ann J Blackman
(74) *Attorney, Agent, or Firm* — Husch Blackwell LLP

(57) ABSTRACT

A unit which includes a camera includes a movable member which can close an optical input port to the camera to provide a zone of privacy in the vicinity of the unit. The member can be moved manually or remotely by electrical signals, or received wireless signals.

20 Claims, 2 Drawing Sheets

PRIVACY SHUTTER FOR CAMERAS

FIELD

The invention pertains to optionally usable mechanisms to limit optical inputs to cameras. More particularly, the invention pertains to shutters which can be used to block optical inputs to cameras to enhance privacy in a region which otherwise might be monitored.

BACKGROUND

Cameras are available for use with regional monitoring systems. Such cameras can provide real-time visual feedback as to on-going activities in a region being monitored.

The resistance of residential users to the use of imaging devices such as cameras may arise because of personal privacy concerns. Likewise a lack of trust in visual electronic indicators and in the integrity of network connected devices.

There is thus a continuing need to address outstanding concerns of individuals in the vicinity of such cameras.

DETAILED DESCRIPTION

Figure 1:
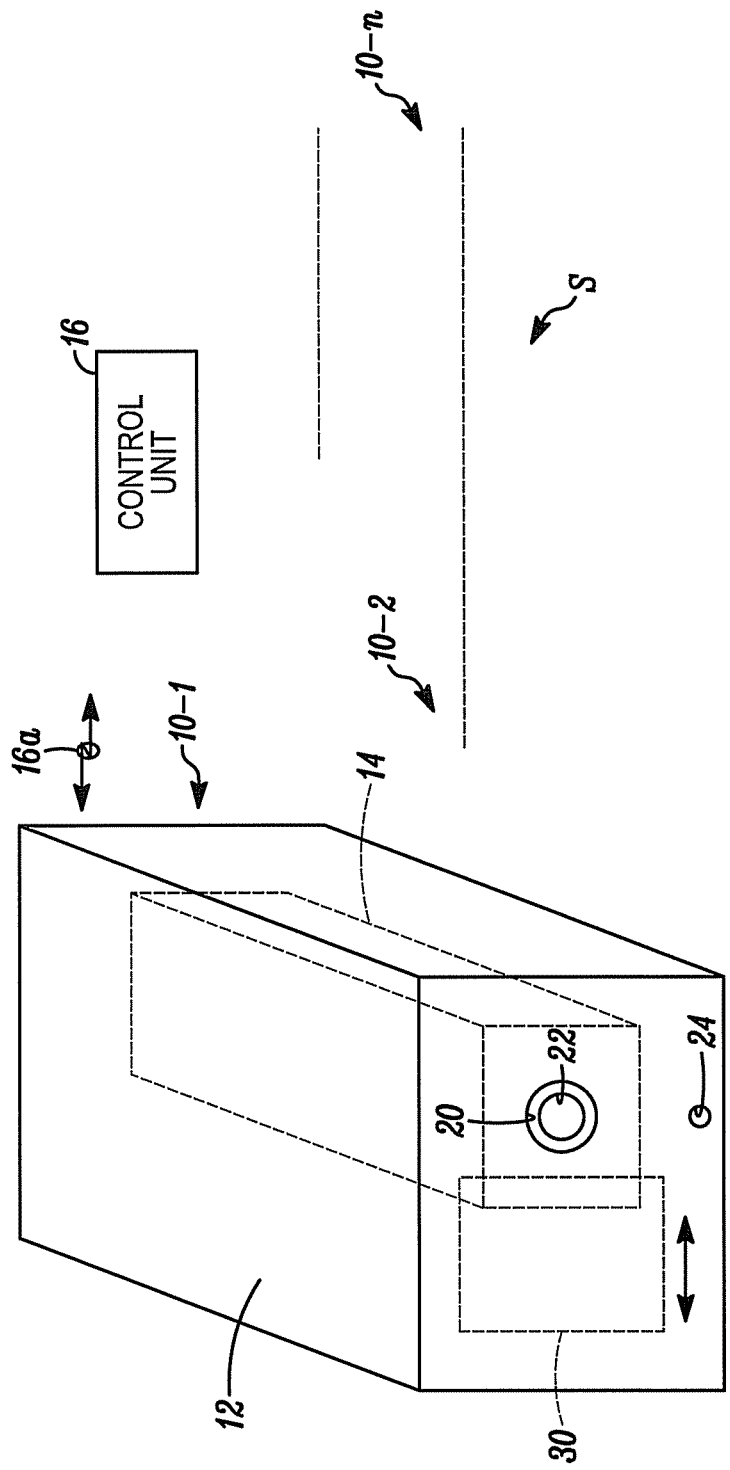
FIG. 1 is a block diagram illustrating aspects of a system which embodies the invention.
Figure 2:
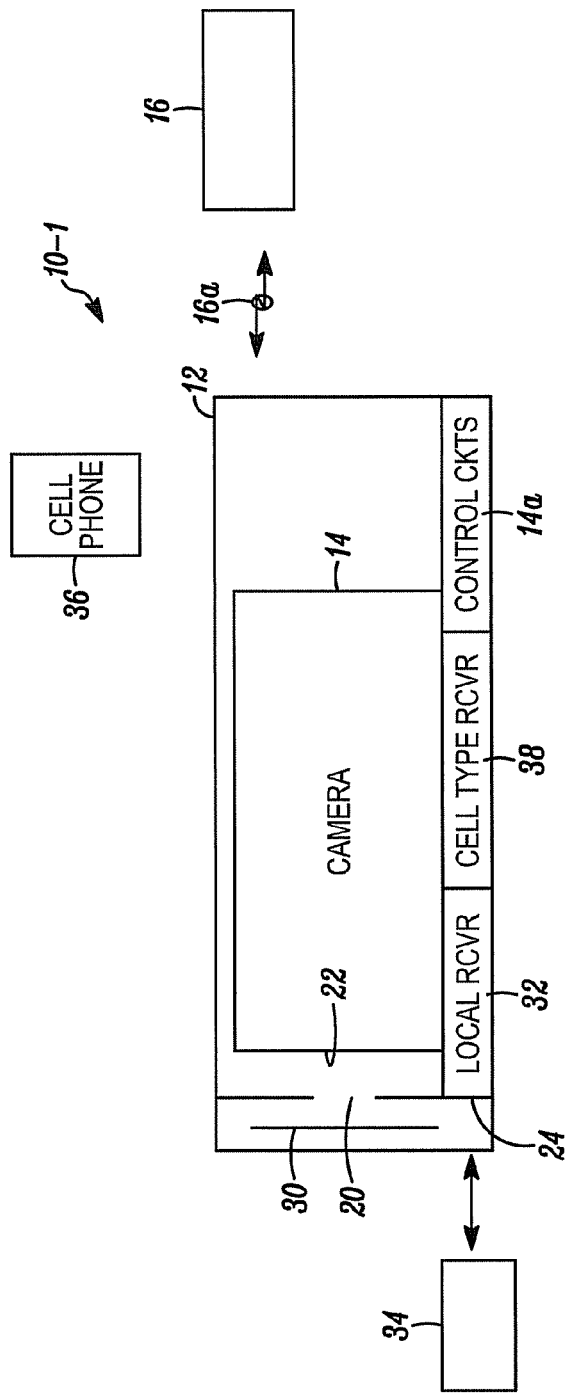
FIG. 2 is a side view of a camera module usable with the system of FIG. 1.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

In one aspect of the invention, a mechanical solution in the form of a recessed, sliding shutter that the user can push in front of the camera's aperture can be provided. It is self-evident to the user that the shutter is totally under their control. If needed the inside of the camera could be examined to ensure that indeed only the user is in control and that the shutter is truly opaque.

Modules which embody the invention can include a recessed, sliding shutter that the user can push, or have moved, in front of the camera's aperture. The shutter can provide a zone of privacy in the vicinity of the respective camera module.

The side of the shutter facing the user could be color coded, for example red, such that the user can physically verify that indeed it is in place and the aperture is blocked. A concurrent message could be sent to the control and the monitoring service to indicate the shutter is active. If the user attempts to arm away, the control can then indicate a check condition for the camera. If the shutter is activated while armed away, an alarm can be triggered. Alternate actions can include sending a warning that the system might have been compromised, or a request to allow arming of the system overriding what might be a known fault.

In another aspect of the invention, a user operable wireless control unit, or cellular-type unit can be usable to move the shutter into a blocking position. Wireless signals from the control unit can be implemented as optical, radio frequency, or ultra-sonic all without limitation. A command could also be entered via a wired input unit such as a keyboard.

FIG. 1 illustrates aspects of a monitoring system S which embodies the invention. A plurality of cameras, such as 10-1, 10-2 . . . 0-n can be distributed through a region R being monitored. Other types of ambient condition detectors can also be included as part of the system. These can include breakage detectors, audio detectors, smoke or gas detectors or the like all without limitation.

The camera modules, such as 10-1 can include a housing 12 which carries a camera 14. The camera 14 can couple signals indicative of two dimensional images of a portion of a region R being supervised or monitored to a monitoring or control panel 16 as would be understood by those of skill in the art. The signals can be transmitted via a wired or wireless link 16a. The panel 16 can include a keyboard to enable a user to input commands.

The exemplary housing 12 can include an optical input port 20 through which the lens or optical input 22 to the camera 14 can monitor the adjacent portion of the region R. A separate input port 24 can be provided as discussed subsequently.

Figure 3A:
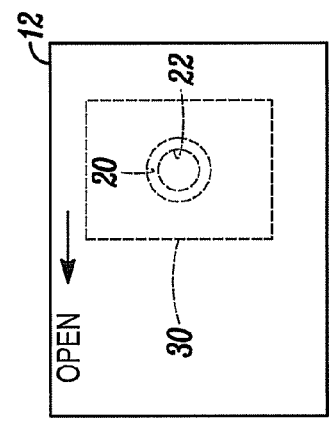
FIGS. 3A and 3B taken together illustrate operation aspects of the camera module of FIG. 2.
Figure 3B:
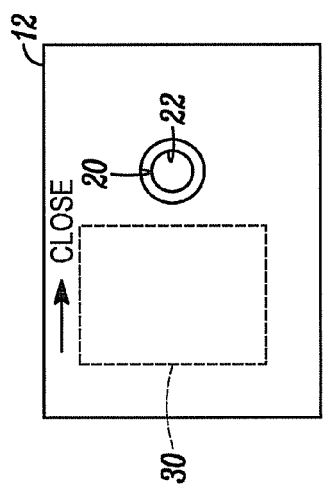

The housing 12 can carry a blocking panel 30 slidable from a non-blocking position, best seen in FIG. 3A to a blocking position, as in FIG. 3B to exclude optical inputs from the camera 22. In the condition illustrated in FIG. 3B, a zone of privacy is provided in the vicinity of the camera module 10-1.

The panel 30 can be manually moved to the blocking position of FIG. 3B. Alternately, the module 10-1 can include a local receiver 32, responsive to optical, ultrasonic or radio frequency signals, which can be coupled to an actuator/control circuits 14a to move the panel 30 in response to a hand held/pendent 34. Alternately, wireless, cellular-type units such as unit 36 can communicate with the common control unit 16 or with a local receiver 38 to move the panel 30 to open or close the optical input port 20.

Those of skill will recognize that other variations come within the scope and spirit of the invention. For example, panel 30 could be moved by a solenoid if the unit 16 receives an input to disarm the system. If the system S goes into an alarmed or armed state, the partition or panel 30 could be automatically opened if closed. Audible feedback such as beeps or clicks could be provided where the shutter 30 changes state. These could be different indicating the panel is opening or closing. Other variations come within the scope and spirit of the invention.

Alternates include, as well as a purely/totally opaque shutter stopping all light, it would also be possible to provide a shutter that was partially opaque. This could be either diffuse or patterned in some way to avoid identification of the exact detail. There might be advantages to this shutter for some situations: it would still identify movement and possibly human shapes, but all details are not present, still protecting certain aspects of privacy. This could be used instead of, or as well as, the opaque shutter. Voice activated closing and opening of the shutter would be another logical extension. Inputs such as fire, silent panic (silent PA) and other potentially life-threatening might be programmed to override the blocked situation. Other alternatives for the simple sliding shutter would be louvre, leaf or diaphragm type shutters.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. An apparatus comprising:
a sensor of an ambient condition with an input port; and
a separately operable mechanism movable from a non-blocking position to a blocking position, wherein, in the blocking position, the mechanism excludes optical inputs to the input port of the sensor to enhance privacy in a region monitored by the sensor, and wherein, the mechanism includes a physical marker, visible to a user in the blocking position, to provide verification that the mechanism is blocking the input port of the sensor.

2. An apparatus as in claim 1 where the mechanism is movable in response to at least one of, a manual input, or an electrical input.

3. An apparatus as in claim 2 where the mechanism includes a wireless receiver which responds to an incoming wireless signal from a displaced source.

4. An apparatus as in claim 2 where the mechanism is movable in response to an incoming electrical signal from a displaced keyboard.

5. An apparatus as in claim 1 where the mechanism responds to at least one of an audio input, or, an optical input.

6. An apparatus as in claim 5 where the mechanism includes at least one of a local manual input, a wireless input, a local keyboard, or, an input from a common control unit.

7. An apparatus as in claim 6 which includes a separate source of wireless signals, where the separate source is manually operable.

8. An apparatus as in claim 6 which includes control circuits to automatically move the mechanism to the non-blocking position in response to the control circuits detecting a selected, settable condition.

9. An apparatus as in claim 1 wherein the physical marker includes a colored portion of the mechanism visible to the user in the blocking position.

10. A device comprising:
a housing with an input port;
a radiant energy sensor carried by the housing and which receives incoming radiant energy via the input port; and
a separately operable mechanism carried by the housing, the mechanism movable from a non-blocking position to a blocking position, wherein, in the blocking position, the mechanism excludes optical inputs to the input port to enhance privacy in a region monitored by the radiant energy sensor, and wherein, the mechanism includes a physical marker, visible to a user in the blocking position, to provide verification that the mechanism is blocking the input port.

11. A device as in claim 10 where the mechanism responds to at least one of a manual input, an electrical input, or, a wireless input.

12. A device as in claim 11 where the manual input moves a member to move the mechanism to the blocking position.

13. A device as in claim 11 where the input activates the mechanism to move the mechanism to the blocking position.

14. A device as in claim 11 where the sensor comprises a camera.

15. A device as in claim 14 where, in the blocking position, the mechanism closes the input port and provides a zone of privacy in the vicinity of the housing.

16. A regional monitoring system comprising:
a common control unit; and
a plurality of sensors coupled to the control unit where at least some of the sensors include a separately operable mechanical element, the mechanical element movable from a non-blocking position to a blocking position, wherein, in the blocking position, the mechanical element excludes optical inputs to the respective sensor to enhance privacy in a region monitored by the respective sensor, and wherein, the mechanical element includes a physical marker, visible to a user in the blocking position, to provide verification that the mechanical element is blocking the optical inputs to the respective sensor.

17. A monitoring system as in claim 16 where at least some of the sensors include an optical input port.

18. A monitoring system as in claim 16 where at least some of the sensors each include a wireless receiver coupled to the mechanical element.

19. A monitoring system as in claim 18 where the mechanical element, at a selected sensor, is movable from the non-blocking position to the blocking position in response to an incoming electrical signal, or a received wireless signal.

20. A monitoring system as in claim 19 where the sensors are selected from a class which includes, smoke sensors, light responsive sensors, thermal sensors, or gas sensors.

* * * * *